(12) United States Patent
Jones et al.

(10) Patent No.: US 8,892,645 B2
(45) Date of Patent: Nov. 18, 2014

(54) METHOD AND SYSTEM FOR SELECTIVE SHARING OF FLAGGED INFORMATION IN A GROUP CHAT ENVIRONMENT

(75) Inventors: Doris L. Jones, Somerville, MA (US); Corinne M. Ryan, Westford, MA (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2106 days.

(21) Appl. No.: 11/608,540

(22) Filed: Dec. 8, 2006

(65) Prior Publication Data

US 2008/0141146 A1   Jun. 12, 2008

(51) Int. Cl.
*G06F 15/16* (2006.01)
*H04L 12/18* (2006.01)
*G06Q 10/10* (2012.01)

(52) U.S. Cl.
CPC .......... *G06Q 10/107* (2013.01); *H04L 12/1822* (2013.01)
USPC ........................................... 709/204

(58) Field of Classification Search
USPC .................. 709/202–225; 705/1; 345/700
See application file for complete search history.

(56) References Cited

U.S. PATENT DOCUMENTS

| | | | |
|---|---|---|---|
| 6,963,901 B1 | 11/2005 | Bates et al. | |
| 7,603,413 B1 * | 10/2009 | Herold et al. | 709/204 |
| 7,716,053 B2 * | 5/2010 | Shimoda et al. | 704/270 |
| 2002/0087643 A1 * | 7/2002 | Parsons et al. | 709/206 |
| 2004/0158610 A1 * | 8/2004 | Davis et al. | 709/206 |
| 2004/0186721 A1 * | 9/2004 | Beynon et al. | 704/270 |
| 2004/0196306 A1 * | 10/2004 | Manto et al. | 345/700 |
| 2004/0236774 A1 * | 11/2004 | Baird et al. | 707/100 |
| 2005/0021643 A1 | 1/2005 | Watanabe et al. | |
| 2005/0283374 A1 * | 12/2005 | Salomon et al. | 705/1 |
| 2005/0289220 A1 | 12/2005 | Chen et al. | |
| 2006/0053195 A1 * | 3/2006 | Schneider et al. | 709/204 |
| 2006/0123347 A1 | 6/2006 | Hewitt et al. | |
| 2007/0112910 A1 * | 5/2007 | Skladman et al. | 709/202 |
| 2007/0135099 A1 * | 6/2007 | Taylor et al. | 455/412.1 |
| 2007/0168448 A1 * | 7/2007 | Garbow et al. | 709/207 |
| 2007/0168511 A1 * | 7/2007 | Brochu et al. | 709/225 |
| 2007/0300169 A1 * | 12/2007 | Jones et al. | 715/764 |
| 2008/0141146 A1 * | 6/2008 | Jones et al. | 715/753 |
| 2008/0263204 A1 * | 10/2008 | Brochu et al. | 709/225 |

\* cited by examiner

*Primary Examiner* — B. Tiv
(74) *Attorney, Agent, or Firm* — David A. Dagg

(57) ABSTRACT

A system for selective sharing of flagged information in a group chat (i.e. instant messaging) that generates a user interface object enabling a flag setting participant to indicate which of the other chat participants can see a visible flag they are setting in association with selected content of the chat session. The flag is then visible only to those indicated other participants, both during the chat session and within copies of the saved chat transcript. A user interface object (e.g. a context window) provides chat participants with the ability to conveniently identify information about individual flags in the chat session, such as the identity of the participant that set a flag, when the flag was created, the priority associated with the flag, and/or other information. The system further enables chat participants to filter the contents of a chat transcript, so that only a subset of the chat transcript is displayed, based on flags contained in the transcript. Chat participants can also associate priorities with specific individual flags and/or all flags set by a given participant, and/or generate a "to do" list based on the flags in the transcript.

18 Claims, 13 Drawing Sheets

METHOD AND SYSTEM FOR SELECTIVE SHARING OF FLAGGED INFORMATION IN A GROUP CHAT ENVIRONMENT

FIELD OF THE INVENTION

The present invention relates generally to user interfaces for instant messaging systems, and more specifically to a method and system for selective sharing of flagged information in a group chat (i.e. instant messaging) environment.

BACKGROUND OF THE INVENTION

As it is generally known, in computer-based communications, instant messaging systems enable instant communications between two or more people over a communication network such as the Internet. Instant messaging typically requires the use of a client program to provide an instant messaging service. Instant messaging differs from electronic mail ("email") in that conversations happen in real-time. Instant messaging sessions are sometimes referred to as "chat" sessions. Examples of existing instant messaging technologies include Qnext, MSN Messenger, AOL Instant Messenger, Yahoo! Messenger, Skype, Google Talk, .NET Messenger Service, Jabber, QQ, iChat and ICQ, and Internet Relay Chat (IRC).

In previous instant messaging applications, a user first initiates a chat session with at least one chat partner. After the session is initiated, information is passed back and forth between the session participants, and is displayed in a transcript area of the application user interface. A problem occurs, however, if a participant wants to further discuss or follow-up on a comment with only a subset of the participants in the chat session. Using existing systems, to accomplish this, the participant must either start a separate side chat session with only those users that are desired, or wait to follow-up later with phone calls or an e-mail conversation. This problem flows from the fact that previous systems have failed to provide any way for multiple chat session participants to flag the same message within a chat session, or for chat session participants to control which other participants can see a flag that they set, either during the chat session or after the chat session has ended.

Accordingly, in order to support more effective sharing of information communicated in a chat session, it would be desirable to have a new system for flagging chat session information that allows multiple session participants to flag the same message, and that allows a participant setting a flag in the chat session to control which other participants are able to see the flag. The new system should further support these features both during the chat session and subsequent to the end of the chat session.

SUMMARY OF THE INVENTION

To address the above described and other shortcomings of the prior art, a new method and system for selective sharing of flagged information in a group chat (i.e. instant messaging) environment is disclosed. The disclosed system generates a user interface object that enables a flag setting participant to indicate which of the other chat participants can see the flag they are setting. The disclosed system then operates to make the flag visible only to those indicated other participants, both during the live chat session and while accessing the saved chat transcript.

The disclosed system generates a user interface object (e.g. a context window) that provides chat participants with the ability to conveniently access information about individual flags, such as the identity of the participant that set the flag, when the flag was created, the priority associated with the flag, and/or other information. The disclosed system further enables chat participants to filter the contents of a chat transcript, so that only a subset of the chat transcript is displayed, based on the flags contained in the transcript. Chat participants can also associate relative priorities with flags, select the visual appearance of flags, and/or generate a "to do" list based on the flags in the transcript.

The disclosed system further operates to enable chat participants to add flags into a chat transcript even after the chat session is over. When a copy of a saved chat transcript is synchronized with the transcript copies of the transcript, the disclosed system shares new flags only with those participants indicated for sharing by the participant that set them.

Thus there is disclosed a new system for flagging chat session information. The disclosed system allows multiple session participants to flag the same message, and allows a participant setting a flag to control which other participants are able to see the flag, both during and after the chat session. The disclosed system further provides convenient access to information about each flag, supports user selected prioritization of flags, user selected visual representations for flags, session content filtering based on flags, and creation of a "to do" list from chat session information based on flags.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
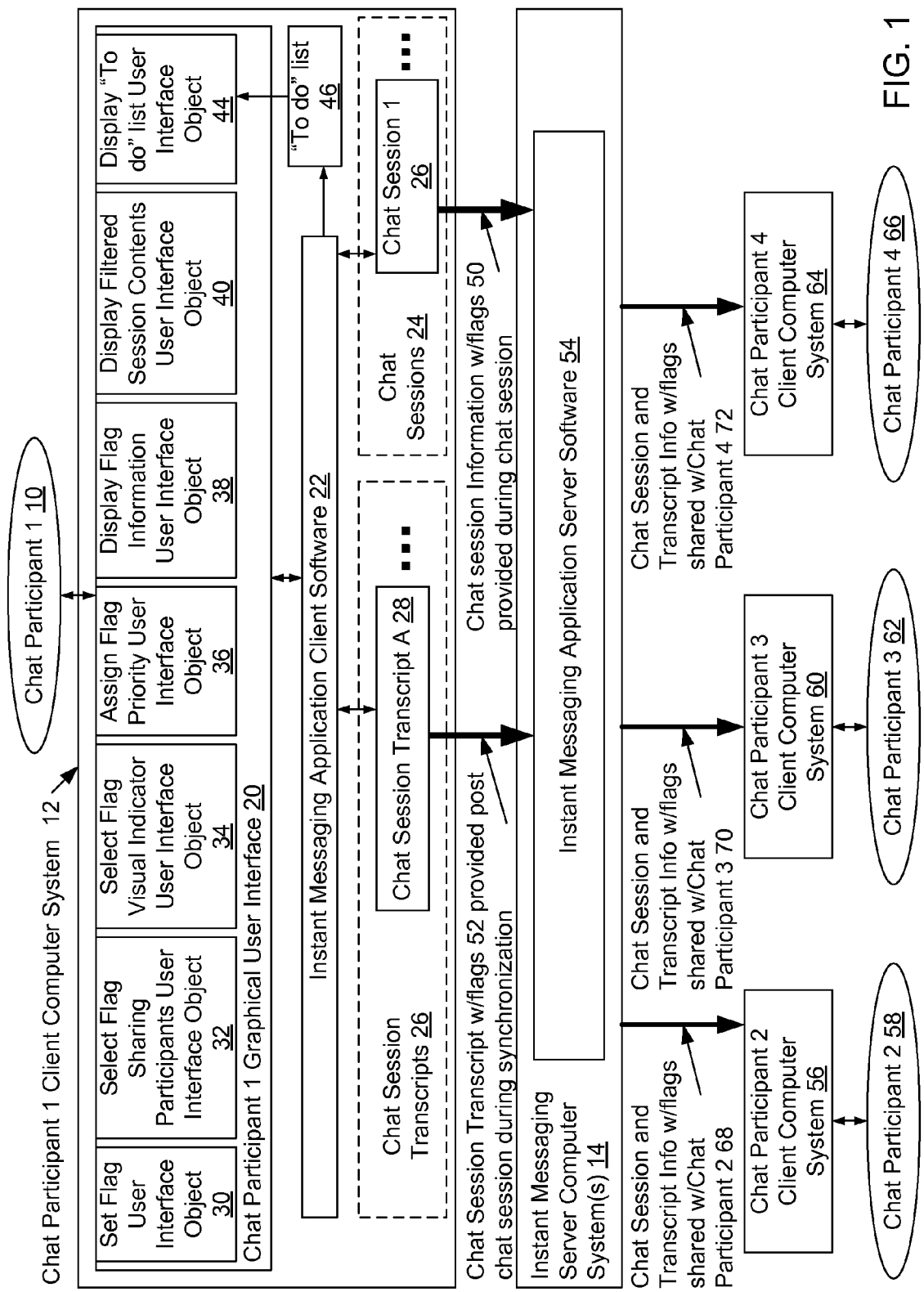
FIG. 1 is a block diagram showing hardware and software components in an illustrative embodiment of the disclosed system.

FIG. 1 is a block diagram showing components in an execution environment including an illustrative embodiment of the disclosed system. As shown in FIG. 1, a Chat Participant 1 10 uses a Chat Participant 1 Client Computer System 12 to perform instant messaging through Instant Messaging Server Computer System(s) 14 with a number of other participants, including a Chat Participant 2 58 that uses a Chat Participant 2 Client Computer System 56, a Chat Participant 3 62 that uses a Chat Participant 3 Client Computer System 60, and a Chat Participant 4 66 that uses a Chat Participant 4 Client Computer System 64. Each line of text typed during an instant messaging session between Chat Participant 1 10 and the other chat participants shown in FIG. 1 passes through the Instant Messaging Application Server Software 54 that executes on the Instant Messaging Server Computer System(s) 14. The Chat Participant 1 Client Computer System 12 is shown including a Chat Participant 1 Graphical User Interface 20 provided at least in part by Instant Messaging Application Client Software 22. While not shown in FIG. 1 for purposes of concise illustration, those skilled in the art will recognize that each of the other client computer systems (56, 60, and 64) in FIG. 1 also include their own client software for providing graphical user interfaces analogous to the user interface 20 for their respective participant users (58, 62 and 66).

During operation of the illustrative embodiment of FIG. 1, the Instant Messaging Application Client Software 22 displays a number of Chat Sessions 24 to the Chat Participant 1 10 through the Chat Participant 1 Graphical User Interface 20, including Chat Session 1 26, etc. When a chat session is ended, it may be saved as one of Chat Session Transcript(s) 26, which are shown including Chat Session Transcript A 28, etc. Saved chat transcripts include all the content of a live chat session in a file or other type of document. Saving of a chat transcript may, for example, be performed by client software 22 in response to a user indication received through the Chat Participant 1 Graphical User Interface 20. After a chat session transcript has been saved, it can subsequently be re-opened for viewing. For example, the Instant Messaging Application Client Software 22 may also be used to display one of the Chat Session Transcripts 26 to the Chat Participant 1 10 through the Chat Participant 1 Graphical User Interface 20. While shown for purposes of illustration as stored within the Chat Participant 1 Client Computer System 12, those skilled in the art will recognize that the Chat Session Transcripts 26 may alternatively be stored to and retrieved from an external server system, such as a personal information server or the like.

As will be further described below, during operation, the Instant Messaging Application Client Software 22 provides the Chat Participant 1 10 with access to various features of the disclosed system through a number of interface objects displayed within the Chat Participant 1 10 Graphical User Interface 20. These are shown in the example of FIG. 1 as a Set Flag User Interface Object 30 that includes user selectable options enabling the Chat Participant 1 10 to set a flag in either a current chat session or a chat session transcript, a Select Flag Sharing Participants User Interface Object 32 that includes user selectable options enabling Chat Participant 1 10 to indicate which other chat participants a flag is to be shared with, a Select Flag Visual Indicator User Interface Object 34 that includes user selectable options enabling the Chat Participant 1 10 to select a visual representation of a flag, an Assign Flag Priority User Interface Object 36 that includes user selectable options enabling Chat Participant 1 10 to assign a relative priority to a flag, a Display Flag Information User Interface Object 38 that displays information about a flag such as the participant that set the flag, the time the flag was set, the priority of the flag, and/or the participants with whom the flag is shared, a Display Filtered Session Contents User Interface Object 40 that selectively displays portions of a chat session or chat session transcript based on one or more user selected flags contained in the session or session transcript, and a Display "To do" list User Interface Object 44 that displays user selected portions of one or more chat sessions and/or chat session transcripts stored as a "To do" list 46 (e.g. within a non-relational database or the like) for Chat Participant 110.

Further during operation of the illustrative embodiment of FIG. 1, shared flags in a chat session or chat session transcript are only made visible to those participants indicated for sharing by the participant setting the flag. The disclosed system may be embodied such that the client computer system of each participant is provided with chat session or chat session transcript information containing only the flags that are shared with that participant, thus ensuring that each participant is only shown those flags that are shared with that participant. For example, during a group chat session between Chat Participant 1 10, Chat Participant 2 58, Chat Participant 3 62, and Chat Participant 4 66, Chat Session Information 50 including flags set by Chat Participant 1 10 is sent by the Instant Messaging Application Client Software 22 to the Instant Messaging Application Server Software 54. For each shared flag contained in the received Chat Session Information 50, the Instant Messaging Application Server Software 54 determines which participants in the chat session that flag is to be shared with. Such sharing information is provided from the Instant Messaging Application Client Software 22 to the Instant Messaging Application Server Software 54 either within the Chat Session and Transcript Information 50 itself (e.g. within the ALT attribute content of an IMAGE HTML tag for each shared flag), or alternatively through any appropriate out of band signaling technique. The Instant Messaging Application Server Software 54 then sends chat session and transcript information to each chat participant containing only the flags shared with that participant. Accordingly, in such an embodiment, Chat Session and Transcript Information 68 includes only those shared flags that are shared with Chat Participant 2 58, Chat Session and Transcript Information 70 includes only those shared flags that are shared with Chat Participant 3 62, and Chat Session and Transcript Information 72 includes only those shared flags that are shared with Chat Participant 4 66.

In an alternative embodiment, the client computer system for each chat participant is provided with all shared flags, as well as the sharing information for each flag indicating which participants the flag is to be displayed to (e.g. within the ALT attribute content of an IMAGE HTML tag for each shared flag). In such an alternative embodiment, the instant messaging application client software for each participant is responsible for displaying only those shared flags that are shared with that participant.

Shared flags within chat session transcripts are also selectively displayed only to those chat participants with which they are shared. Accordingly, when the Chat Session Transcript A 28 is displayed to the Chat Participant 1 10 through the Chat Participant 1 Graphical User Interface 20, only those shared flags that are shared with Chat Participant 1 10 are made visible. When the Chat Participant 1 10 sets a new shared flag in the Chat Session Transcript A 28, the new shared flag is passed in the Chat Session Transcript Information 52 to the Instant Messaging Application Server Software 54, for example during an operation that synchronizes modified copies of the Chat Session Transcript A 28 separately stored by participants in the original chat session. The Instant Messaging Application Server Software 54 then forwards the new shared flag to only those participants with which the shared flag is to be shared, thus causing the shared flag to only be displayed to those participants. Alternatively, the newly added shared flag may be forwarded to all participants, and the client instant messaging software on each participant's client computer system makes the shared flag visible only to those participants with which the shared flag is to be shared.

While for purposes of concise illustration FIG. 1 shows the Chat Session Transcript with flags 52 flowing out of the Chat Participant 1 Client Computer System 12, flags added by other participants and shared with Chat Participant 1 10 will similarly flow from the client computer systems of those other participants to the Chat Session Transcript A 28 in the Chat Participant 1 Client Computer System 12 during a synchronization operation.

The client computer systems 12, 56, 60 and 64, and server computer system(s) 14, are communicably connected, for example by way of a communication network such as the Internet, a Local Area Network (LAN), or other specific type of communication network. The client software 22 may, for example, use a client-server approach to operating with server application software executing on the server computer system 14 to provide portions of the graphical user interface 20. Alternatively, the client software 22 and 32 may include Web browser program functionality operable to request and receive Web page content, including HTML (Hypertext Markup Language) code or the like, from the Instant Messaging Server 14, and to render such Web page content in the user interface 20.

The client computer systems 12, 56, 60 and 64, and the server computer system(s) 14, may each include at least one processor, program storage, such as memory and/or another computer readable medium, for storing program code executable on the processor, and one or more input/output devices and/or interfaces, such as data communication and/or peripheral devices and/or interfaces. The client computer systems 12, 56, 60 and 64, and the server computer system(s) 14, may each further include appropriate operating system software. The chat session and/or transcript information communicated in the example of FIG. 1 may be formatted and/or communicated consistent with any specific public or proprietary instant messaging protocol and/or service, as appropriate for a given embodiment of the disclosed system, such as, for example, XMPP (EXtensible Messaging and Presence Protocol), IRC (Internet Relay Chat), and the like.

Figure 2:
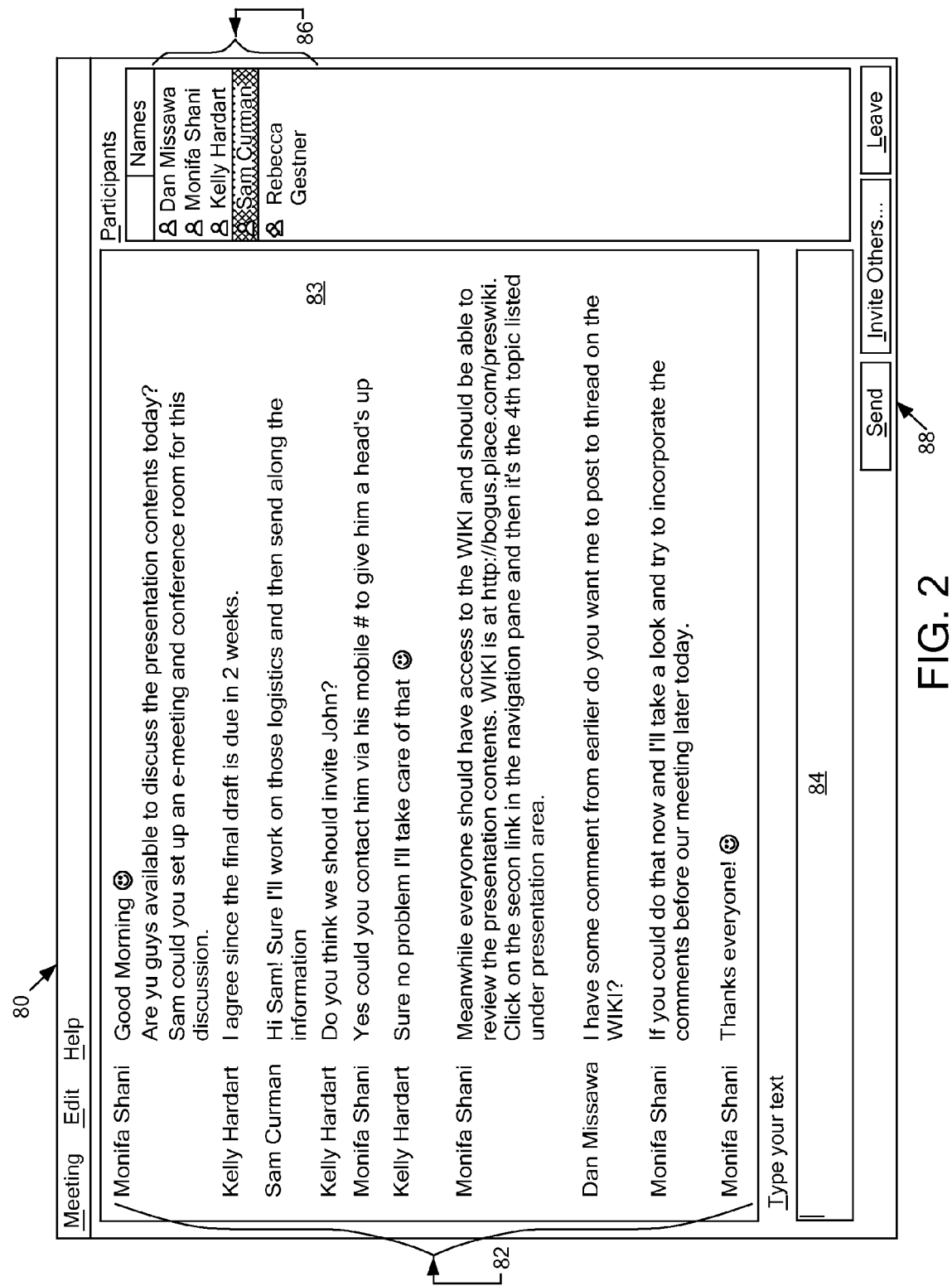
FIG. 2 is a screen shot showing a user interface to an instant messaging session provided by an illustrative embodiment of the disclosed system.

FIG. 2 is a screen shot showing a chat session user interface object 80 provided by an illustrative embodiment of the disclosed system. The user interface object 80 may be provided, for example, as at least part of the Chat Participant 1 Graphical User Interface 20 shown in FIG. 1. As shown in FIG. 2, the user interface object 80 displays a number of messages 82 within a transcript display region 83. A list of participants 86 lists the users that are participants in the chat session provided through the user interface object 80, and accordingly with whom the messages 82 are shared during the chat session. A message composition region 84 enables a local user (e.g. Chat Participant 1 10) to compose a message that is added to the messages 82 when the user clicks on the Send button 88.

Figure 3:
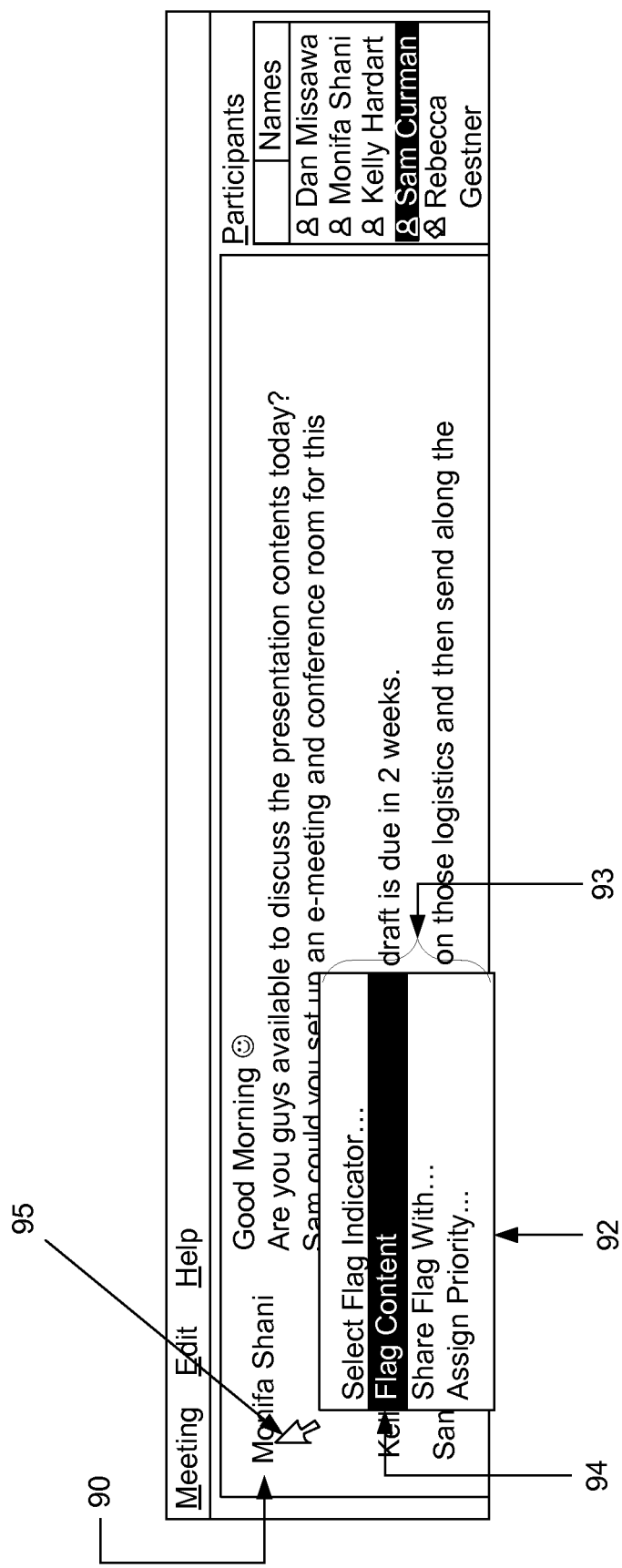
FIG. 3 shows a portion of the screen shot of FIG. 2, together with an example of a set flag user interface object generated by an illustrative embodiment of the disclosed system, in which a flag content option is selected.

FIG. 3 shows a portion of the screen shot of FIG. 2, together with a Set Flag User Interface Object 92 generated by an illustrative embodiment of the disclosed system, in which a Flag Content Option 94 has been selected. The Set Flag User Interface Object 92 is an example of the Set Flag User Interface Object 30 shown in FIG. 1. In one embodiment, the Set Flag User Interface Object 92 is generated in response to the user performing a right click, after the user has selected a content portion of a chat session. In the example of FIG. 3, the user has clicked on the message 90 from Monifa Shani in order to select that message, as indicated by the presence of the cursor 95 over the message 90 from Monifa Shani. The user can then select from the Selectable Options 93 to cause the disclosed system to perform one or more flag operations, by clicking on specific options corresponding to the desired operations. In FIG. 3, the user has clicked on the Flag Content Option 94. As a result, the disclosed system operates to generate a visible flag indicating the content of the message 90 from Monifa Shani. The result of the disclosed system performing the Flag Content Option 94 is shown by the flag 100 in FIG. 4. In one embodiment, each visible flag image is inserted into the chat transcript and surrounded by an HTML anchor, which is a destination of a Web hyperlink, and is specified by the <a> HTML element. A hyperlink for each such HTML anchor is stored within the saved chat transcript, for example as a corresponding hot link stored at the beginning of the saved chat transcript. Information regarding shared flags, e.g. the participant that set the flag, the participants with whom the flag is to be shared, the date and/or time the flag was set, the priority of the flag, etc., is stored in the ALT attribute contents of the IMAGE HTML tag for each shared flag.

Figure 4:
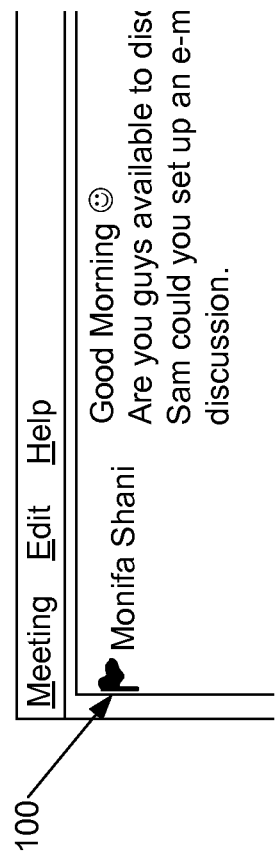
FIG. 4 shows a portion of the screen shot of FIG. 2, and a flag generated by an illustrative embodiment of the disclosed system.

FIG. 4 shows a portion of the screen shot of FIG. 2, with a Flag 100 generated by an illustrative embodiment of the disclosed system. The Flag 100 of FIG. 4 is, for example, the result of the user clicking on the Flag Content option 94 shown in FIG. 3.

Figure 5:
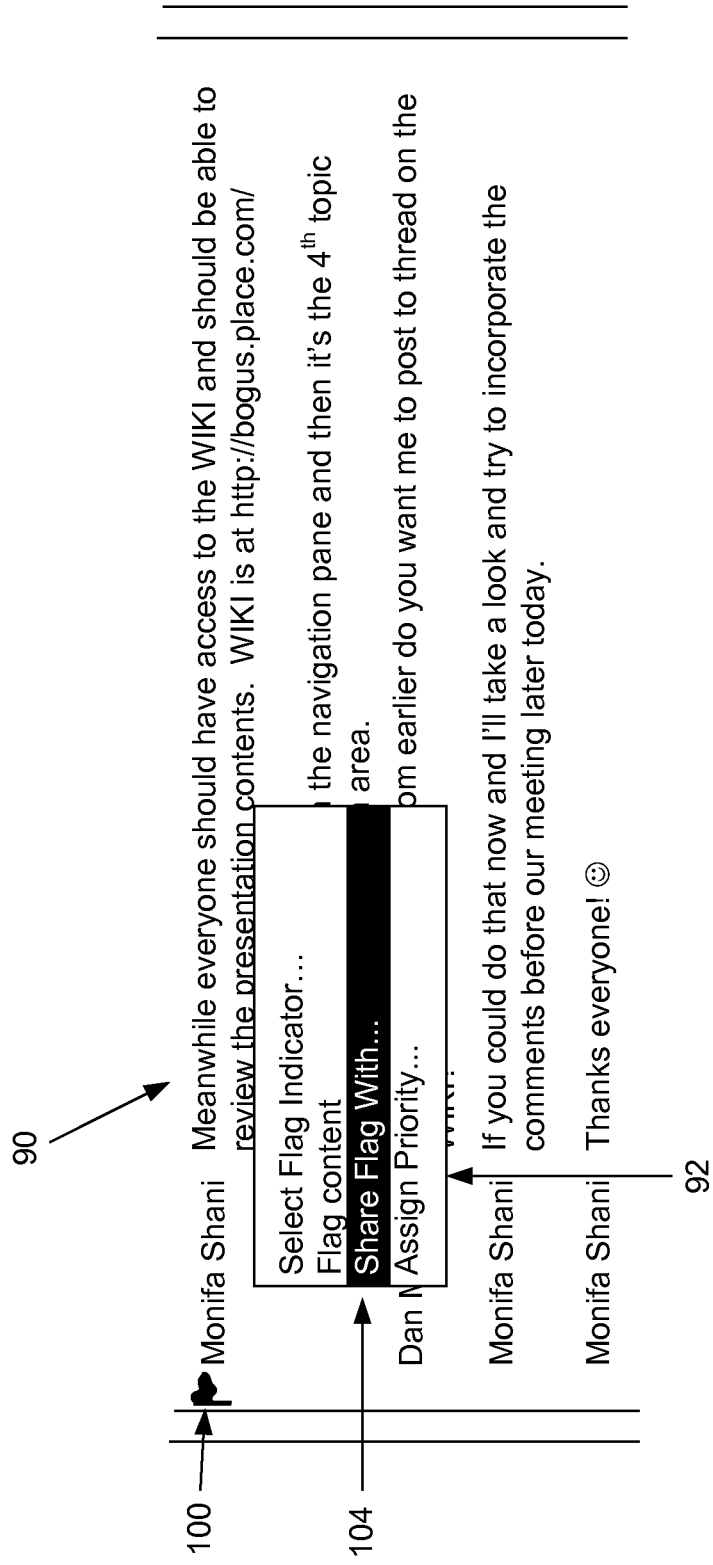
FIG. 5 shows a portion of the screen shot of FIG. 2, together with an example of a set flag user interface object generated by an illustrative embodiment of the disclosed system, in which a flag sharing option is selected.

FIG. 5 shows a portion of the screen shot of FIG. 2, together with the Set Flag User Interface Object 92 generated by an illustrative embodiment of the disclosed system, in which a Flag Sharing Option 104 has been selected by the user, for example by clicking on the Flag Sharing Option 104. The disclosed system operates to generate the Select Flag Sharing Participants User Interface Object 110 of FIG. 6 as a result of the user clicking on the Flag Sharing Option 104 shown in FIG. 4. The Select Flag Sharing Participants User Interface Object 110 is an example of the Select Flag Sharing Participants User Interface Object 32 shown in FIG. 1, and allows the user to select the users with which the Flag 100 is to be shared.

Figure 6:
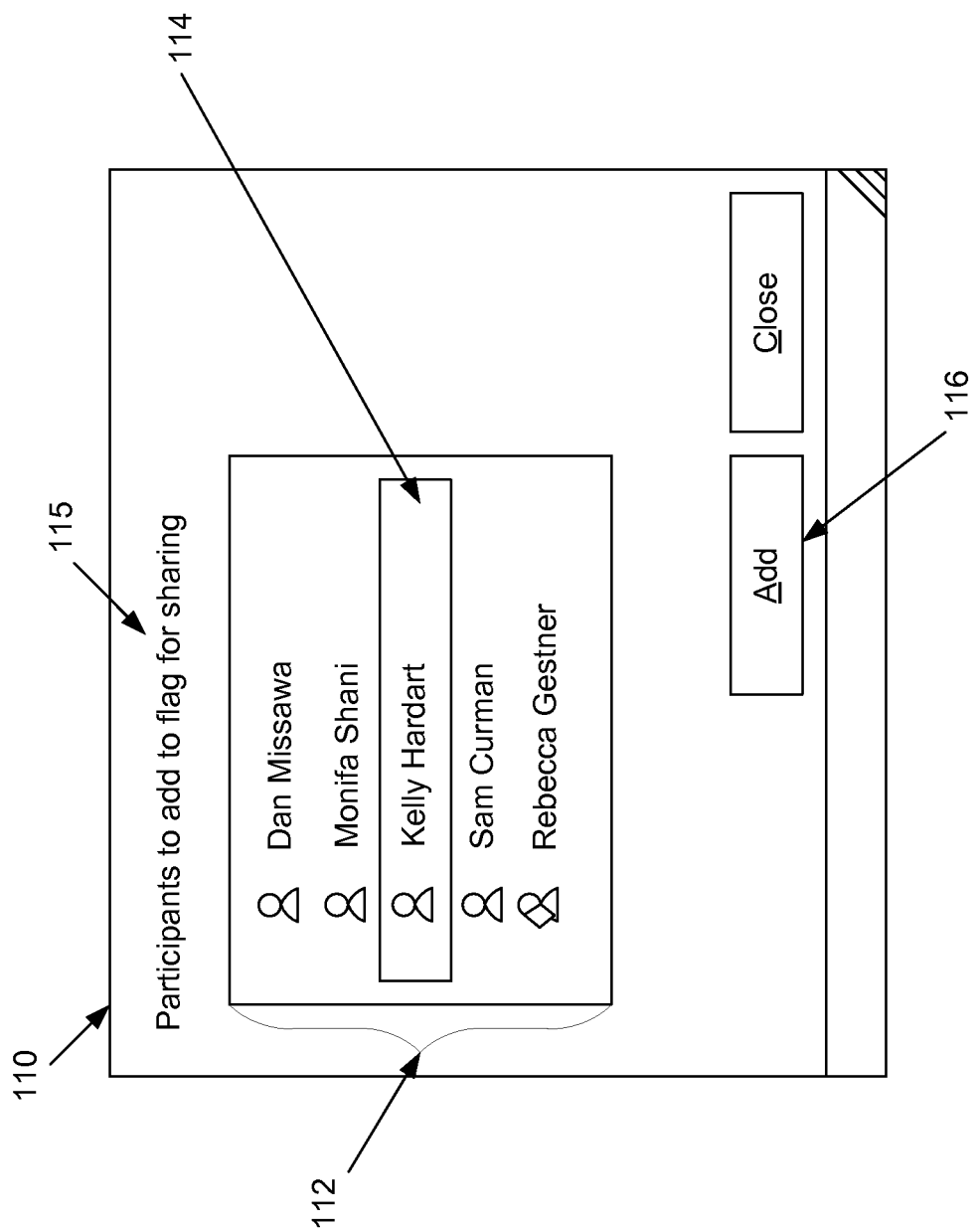
FIG. 6 shows an example of a select flag sharing participants user interface object generated by an illustrative embodiment of the disclosed system.
Figure 7:
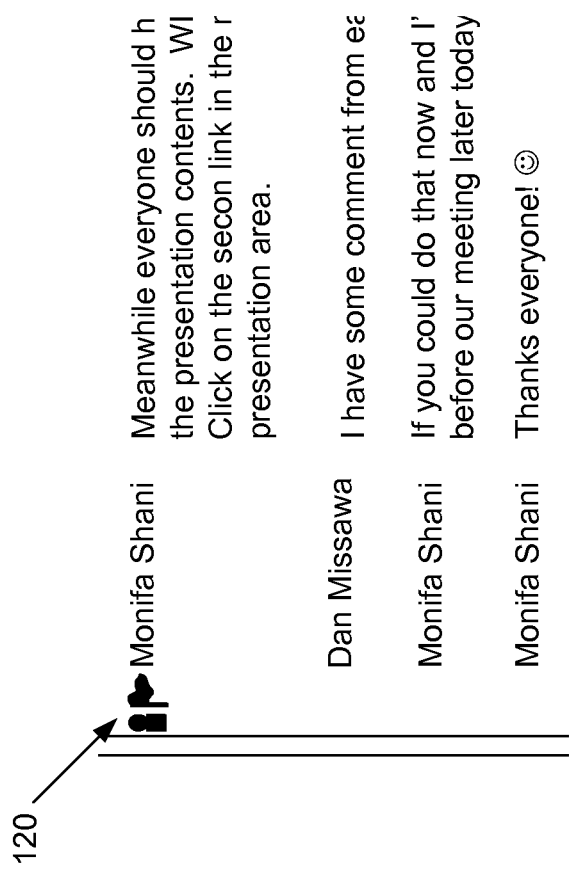
FIG. 7 shows a portion of the screen shot of FIG. 2, and a shared flag generated by an illustrative embodiment of the disclosed system.

As shown in FIG. 6, the Select Flag Sharing Participants User Interface Object 110 has a text title 115 explaining to the user that it includes a list 112 of selectable participants in a chat session are displayed to the user, so that the user can select those participants with which an existing flag associated with content in the chat session (e.g. the previously set Flag 100 associated with message 90 from Monifa Shani) should be shared. In the example of FIG. 6, the user has selected the list element 114 for participant "Kelly Hardart", for example by clicking on the list element 114. As a result, if the user now clicks on the "Add" button 116, the disclosed system will cause the Flag 100 of FIG. 5 to become a shared flag that is shared with the participant "Kelly Hardart". The result of causing the Flag 100 to be shared with the selected participant "Kelly Hardart" is the Shared Flag 120 shown in FIG. 7. In the example of FIG. 7, the Shared Flag 120 has a visually distinct appearance from the non-shared Flag 100 of FIG. 4, in order to visually indicate that it is now shared with at least one other participant.

Figure 8:
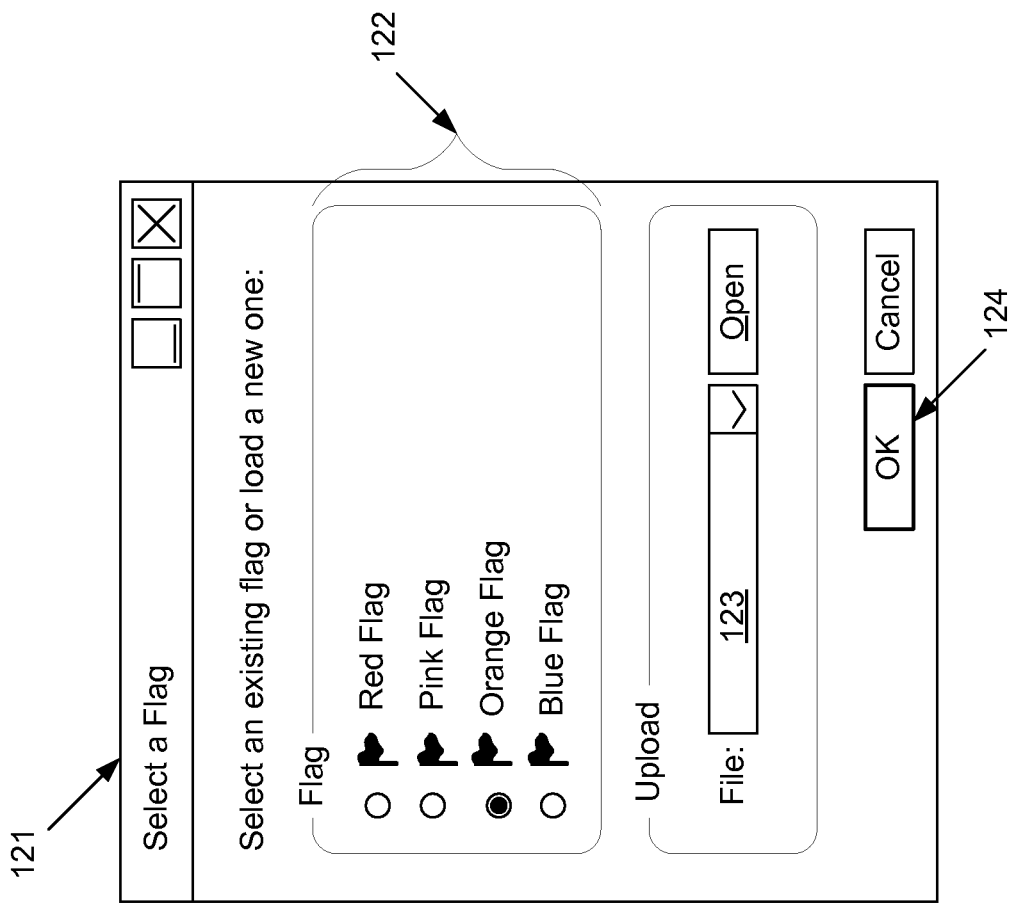
FIG. 8 shows an illustrative example of a select flag visual indicator user interface object.

The general structure and appearance of the Select Flag Sharing Participants User Interface Object 110 shown in FIG. 6 may also be used in an embodiment of the disclosed system to provide the Select Flag Visual Indicator User Interface Object 34 and Assign Flag Priority User Interface Object 36 of FIG. 1. For example, as shown in FIG. 8, an illustrative Select Flag Visual Indicator User Interface Object 121 displays a list 122 of selectable images from which the user can select as the visual indicator for a flag. The text title in the Select Flag Visual Indicator User Interface Object 121 accordingly explains that the displayed list 122 is a list of selectable images, and that an image file can be uploaded through the field 123. In a first embodiment, clicking on the OK button 124 results in use of the selected image to display a currently selected flag. Alternatively, clicking on the OK button 124 results in use of the selected image to display all flags set by the local user.

Figure 9:
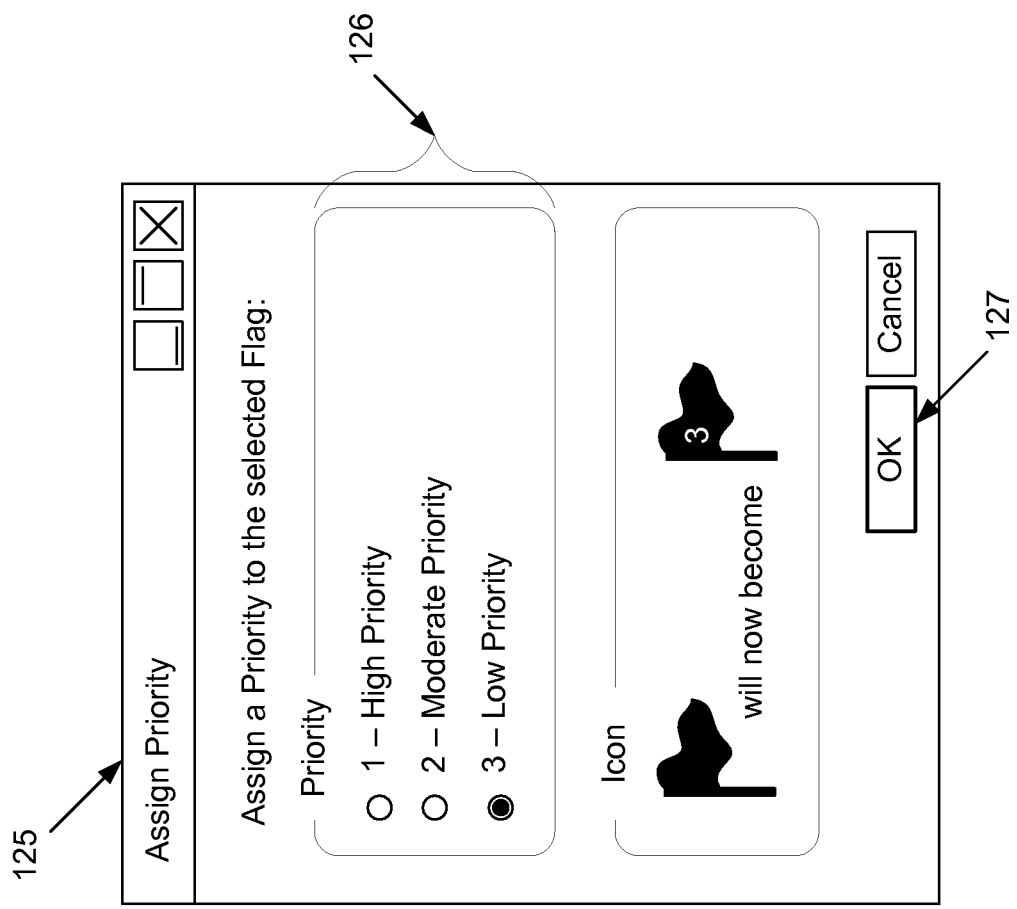
FIG. 9 shows an illustrative example of an assign flag priority user interface object.

Similarly, FIG. 9 shows an illustrative Assign Flag Priority User Interface Object 125 displaying a list 126 of selectable priorities (e.g. High Priority 1, Moderate Priority 2, and Low Priority 3) from which the user can select for association with a selected flag. The text title in the Assign Flag Priority User Interface Object 125 of FIG. 9 explains that the list 126 in the display object is a list of priorities from which a priority can be selected. The visual indication of the selected flag may also change to reflect the priority assigned to the flag through the Assign Flag Priority User Interface Object 125 when the user clicks on the button 127.

Figure 10:
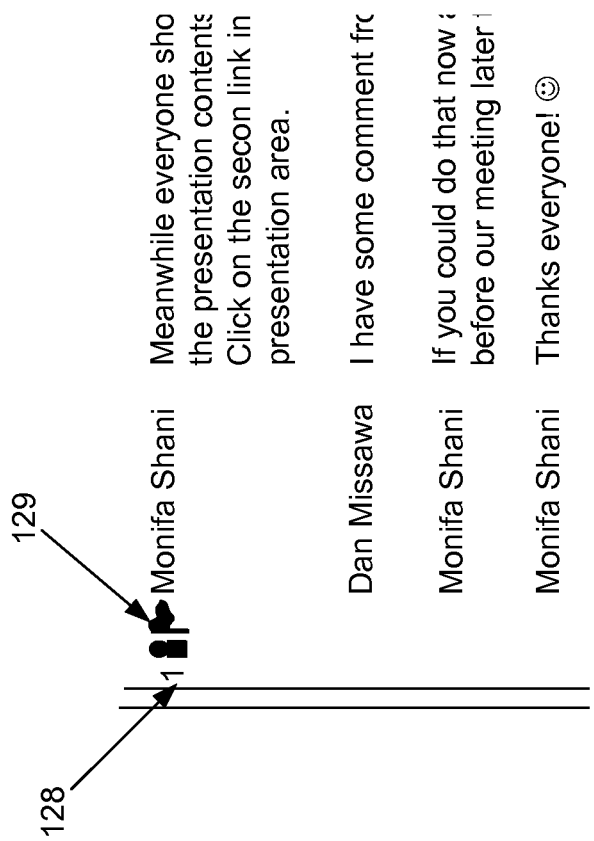
FIG. 10 shows a portion of the screen shot of FIG. 2, and a priority set through an illustrative embodiment of the disclosed system.

FIG. 10 shows an example of a visually displayed Flag Priority 128 set by a user on a shared flag 129 using the Assign Flag Priority User Interface Object 36. The Flag Priority 122 is associated with the Shared Flag 129.

Figure 11:
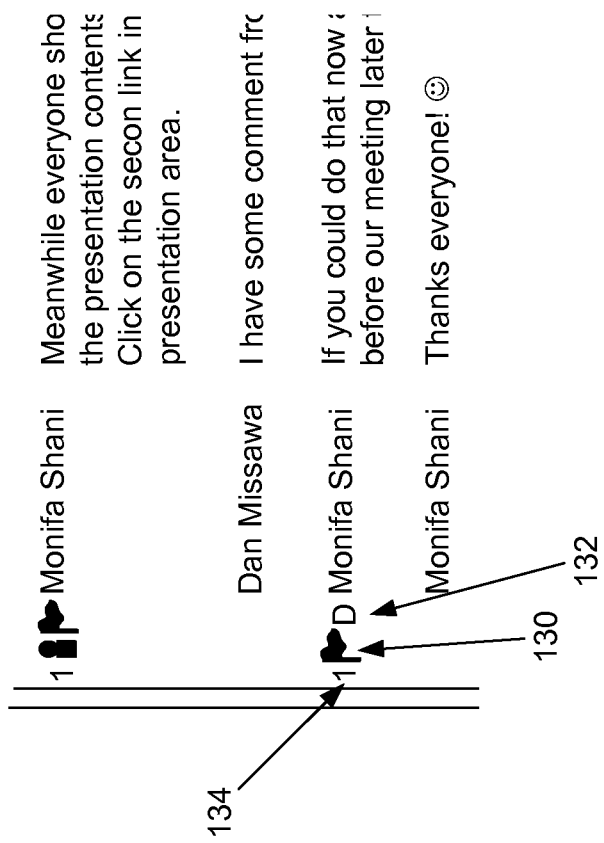
FIG. 11 shows a portion of the screen shot of FIG. 2, and a flag set by another user that has been assigned a distinct visual representation and priority (e.g. based on local user preferences)

FIG. 11 shows another example of a Flag Priority 134 together with a Shared Flag 130 and an indicator ("D") 132 that the Shared Flag 130 was set by a specific participant, in this case the participant "Dan Missawa". For example, in an embodiment of the disclosed system, a user can indicate a visual representation and priority to be assigned to a shared flag that was set by them, through the Select Flag Visual Indicator User Interface Object 34 and Assign Flag Priority User Interface Object 36 shown in FIG. 1. In an alternative embodiment, the local user is enabled to select the visual representation and/or priority of shared flags that were set by other participants, at least with regard to the display of such shared flags on the local user's client system. In another alternative embodiment, the local user's personal settings can be configured to cause all flags set by another specified participant to be displayed on the local user's client system using a selected representation, and/or to assign a specific priority to all flags set by a specific user, again for use on the local user's client system. For example, on the local user's client system, the flag 130 may be displayed in the color red, and assigned the priority "1" 134, as a result of the local user having defined a personal setting indicating that all flags set by the participant "Dan Missawa" are to be displayed in red and assigned the priority "1".

Figure 12:
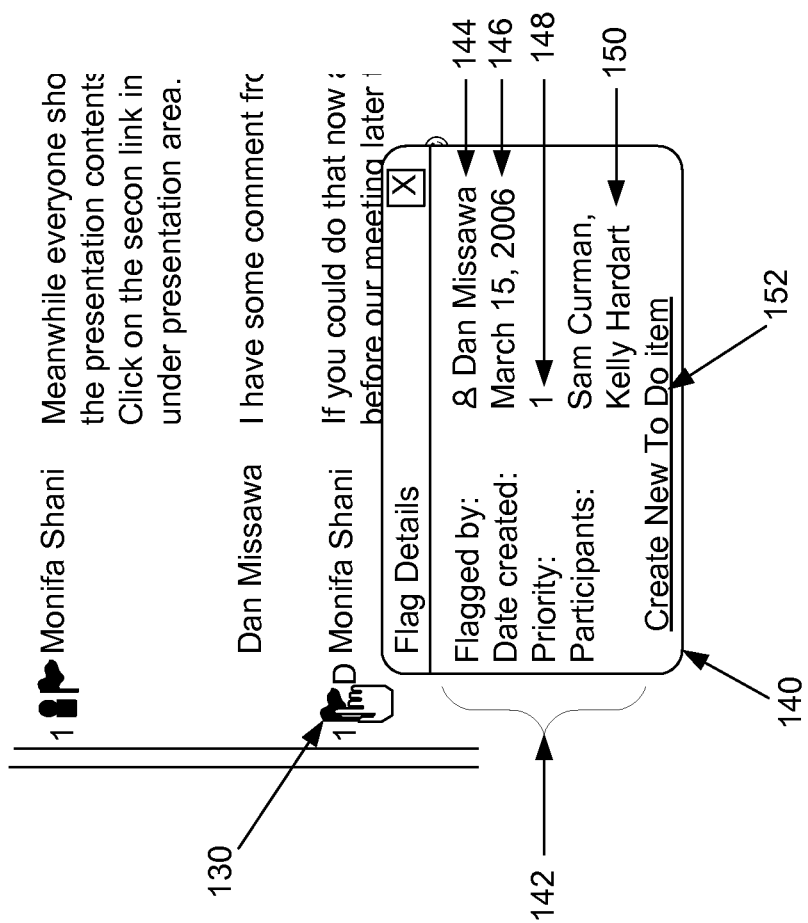
FIG. 12 shows an example of a display flag information user interface object generated by an illustrative embodiment of the disclosed system.

FIG. 12 shows an example of a Display Flag Information User Interface Object 140 generated by an illustrative embodiment of the disclosed system. The Display Flag Information User Interface Object 140 of FIG. 12 is an example of the Display Flag Information User Interface Object 38 of FIG. 1. In the embodiment of FIG. 12, the disclosed system generates the Display Flag Information User Interface Object 140 as a context menu displayed when the user right clicks while the cursor is located over a shared flag, e.g. the Shared Flag 130. The Display Flag Information User Interface Object 140 displays information 142 regarding the Shared Flag 130, including the identity 144 of the participant that set the Shared Flag 130, the date 146 on which the Shared Flag 130 was set, the priority 148 of the Shared Flag 130, and the participants 150 with whom the Shared Flag 130 is shared.

Further in the embodiment of FIG. 12, the Display Flag Information User Interface Object 140 includes an option 152 that enables the user to add the message associated with the Shared Flag 130 to an electronically stored "To do" list, such as the "To do" list 46 shown in FIG. 1, by clicking on the option 152. The messages added to the "To do" list in this way can then be accessed by the local user (e.g. Chat Participant 1 10) through the Display "To do" list User Interface Object 44, which may, for example, have an appearance corresponding to the visual appearance of the messages 82 in the chat session user interface object 80, albeit with only those chat messages displayed that have been added by the user to the "To do" list through the option 152.

Figure 13:
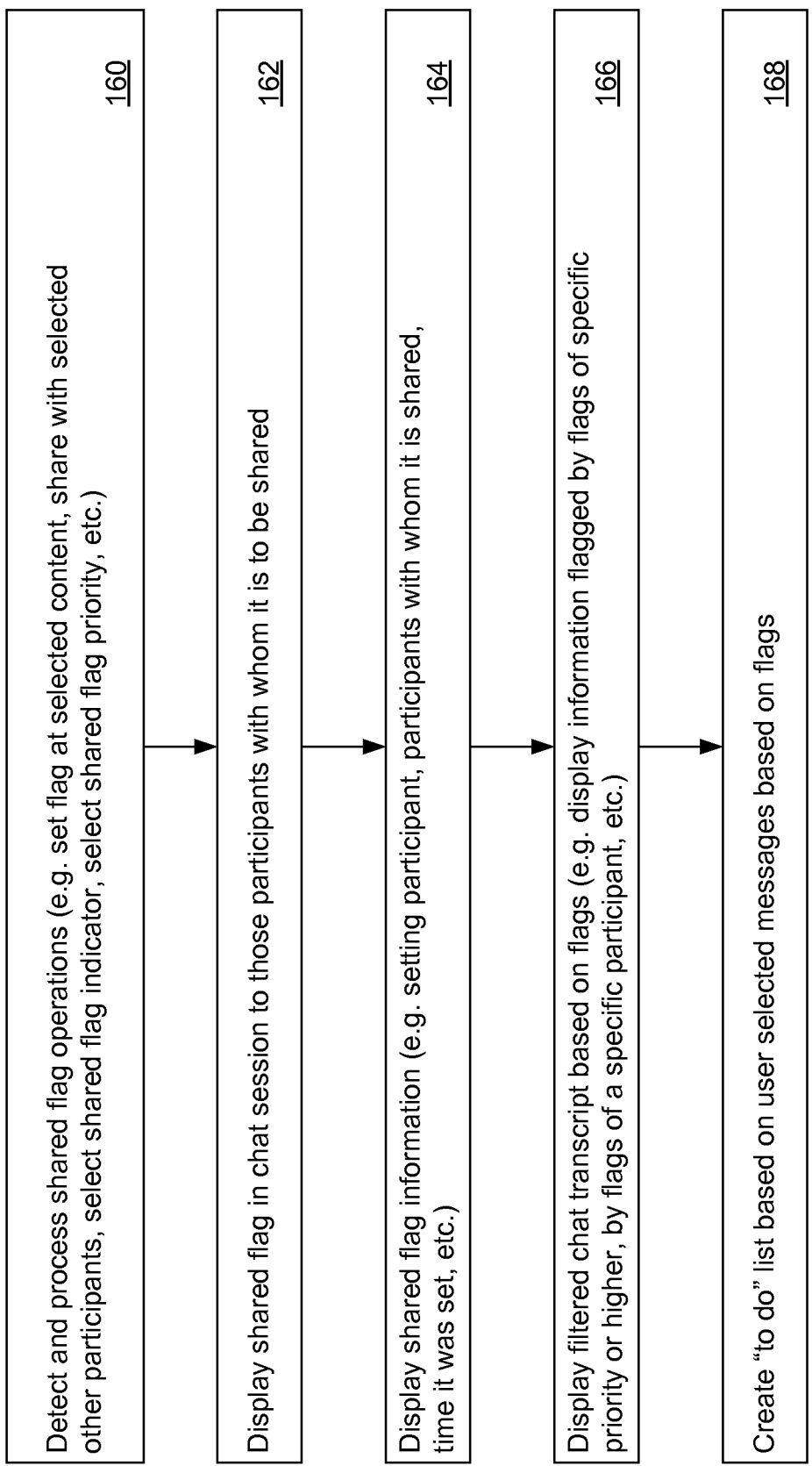
FIG. 13 is a flow chart showing steps performed during operation of an illustrative embodiment of the disclosed system.

FIG. 13 is a flow chart showing steps performed during operation of an illustrative embodiment of the disclosed system. As shown in FIG. 13, at step 160, the disclosed system detects and processes one or more user selected flag operations that set a shared flag and/or define the attributes (e.g. participants for sharing, appearance, and priority) of a previously set shared flag. For example, a first operation indicating that a flag should be set at a selected portion of chat content may be detected, causing the disclosed system to generate a visible flag at the selected chat content. A subsequent operation may be detected indicating that the flag is to be shared only with one or more selected chat participants, causing the disclosed system to share the flag with only those selected participants. A subsequent operation may be detected indicating that a selected priority is to be associated with the shared flag, causing the disclosed system to associate the selected priority with the shared flag. And a subsequent operation may be detected indicating that a selected visual representation is to be used when displaying the shared flag, causing the disclosed system to display the shared flag using the selected visual representation.

At step 162, responsive to the shared flag operations processed at step 160, the disclosed system operates to display the shared flag only with those participants with whom it is to be shared. At step 164, the disclosed system displays information regarding the shared flag (e.g. participant that set the flag, date and/or time the flag was set, priority of the flag, participants with whom it is shared, etc.) with a local user. At step 166, the disclosed system displays a chat transcript that is filtered based on one or more selected flags. For example, a user may indicate to the disclosed system that a filtered view of a chat transcript is to be displayed, such as through the Display Filtered Session Content User Interface Object 40 of FIG. 1. The user may indicate that only messages flagged by a specific participant are to be shown, that only messages flagged with flags at a specified priority or higher are to be shown, etc. The filtered set of messages displayed as a result would, for example, have the appearance of the messages 82 in the chat session user interface object 80, albeit with only those messages displayed that are associated with the selected flags.

At step 168, a "To do" list is created, for example through a user interface construct provided through a Display Flag Information User Interface Object 38, such as the hotlink 152 shown in FIG. 12. The "To do" list created at step 169 corresponds to the "To do" list 46 shown in FIG. 1, and may be displayed to the local user through the Display "To do" list User Interface Object 44.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method, performed in a computer system, for selective sharing of flagged information in a group chat session, comprising said computer system performing the steps of:
generating a flag setting user interface object that enables a user to insert a visible flag in the transcript display area of an instant messaging user interface;
wherein said flag setting user interface object further enables said user to select which other participants in said group chat session to share said visible flag with;
inserting said visible flag into said group chat session in response to said user selecting a line of content within said transcript display area of said instant messaging user interface, wherein said visible flag visually indicates said selected line of content; and
making said visible flag visible, both during and after said group chat session, only to said selected other participants in said group chat session, wherein said selected other participants in said group chat session are a subset of said participants in said group chat session.

2. The method of claim 1, further comprising:
wherein said flag setting user interface further enables said user to select a priority to be associated with said visible flag; and
associating said selected priority with said visible flag.

3. The method of claim 2, further comprising:
wherein said flag setting user interface further enables said user to select a visual representation of said visible flag from a plurality of flag representations; and
generating said visible flag using said selected one of said plurality of possible flag representations.

4. The method of claim 3, further comprising:
generating a user interface display object that provides information regarding said visible flag, wherein said information regarding said visible flag includes said selected participants in said group chat session.

5. The method of claim 4, wherein said information regarding said visible flag further includes said selected priority.

6. The method of claim 5, wherein said information regarding said visible flag further includes a time at which said visible flag was set.

7. The method of claim 6, wherein said information regarding said visible flag further includes an identity of a participant that set said visible flag.

8. The method of claim 4, further comprising:
filtering a transcript of said group chat session based on said visible flag, wherein said filtering includes only displaying content from said transcript of said group chat session indicated by visible flags having the same priority as said visible flag.

9. The method of claim 4, further comprising:
filtering a transcript of said group chat session based on said visible flag, wherein said filtering includes only displaying content from said transcript of said group chat session indicated by visible flags set by the same participant that set said visible flag.

10. The method of claim 6, further comprising:
generating a to do list for a participant responsive to priorities associated with a plurality of visible flags set in said transcript of said group chat session.

11. A computer system including a computer readable memory, wherein said computer readable memory has stored thereon program code for selective sharing of flagged information in a group chat session, said program code comprising:
program code for generating a flag setting user interface object that enables a user to insert a visible flag in the transcript display area of an instant messaging user interface;
wherein said flag setting user interface object further enables said user to select which other participants in said group chat session to share said visible flag with;
program code for inserting said visible flag into said group chat session in response to said user selecting a line of content within said transcript display area of said instant messaging user interface, wherein said visible flag visually indicates said selected line of content; and
program code for making said visible flag visible, both during and after said group chat session, only to said selected other participants in said group chat session, wherein said selected other participants in said group chat session are a subset of said participants in said group chat session.

12. The computer system of claim 11, further comprising:
wherein said flag setting user interface further enables said user to select a priority to be associated with said visible flag; and
program code for associating said selected priority with said visible flag.

13. The computer system of claim 12, further comprising:
wherein said flag setting user interface further enables said user to select a visual representation of said visible flag from a plurality of flag representations; and
program code for generating said visible flag using said selected one of said plurality of possible flag representations.

14. The computer system of claim 13, said program code further comprising:
program code for generating a user interface display object that provides information regarding said visible flag, wherein said information regarding said visible flag includes said selected participants in said group chat session, said selected priority, a time at which said visible flag was set, and an identity of a participant that set said visible flag.

15. The computer system of claim 14, said program code further comprising:
program code for filtering a transcript of said group chat session based on said visible flag, wherein said filtering includes only displaying content from said transcript of said group chat session indicated by visible flags having the same priority as said visible flag.

16. The computer system of claim 15, said program code further comprising:
program code for filtering a transcript of said group chat session based on said visible flag, wherein said filtering includes only displaying content from said transcript of said group chat session indicated by visible flags set by the same participant that set said visible flag.

17. The computer system of claim 16, said program code further comprising:
program code for generating a to do list for a participant responsive to priorities associated with a plurality of visible flags set in said transcript of said group chat session.

18. A computer program product including a non-transitory computer readable storage medium, said a non-transitory computer readable storage medium having program code stored thereon for selective sharing of flagged information in a group chat session, said program code comprising:
program code for generating a flag setting user interface object that enables a user to insert a visible flag in the transcript display area of an instant messaging user interface; wherein said flag setting user interface object further enables said user to select which other participants in said group chat session to share said visible flag with;
program code for inserting said visible flag into said group chat session in response to said user selecting a line of content within said transcript display area of said instant messaging user interface, wherein said visible flag visually indicates said selected line of content; and
program code for making said visible flag visible, both during and after said group chat session, only to said selected other participants in said group chat session,
wherein said selected other participants in said group chat session are a subset of said participants in said group chat session.

* * * * *